United States Patent [19]

Moffat et al.

[11] Patent Number: 5,449,724
[45] Date of Patent: Sep. 12, 1995

[54] STABLE FREE RADICAL POLYMERIZATION PROCESS AND THERMOPLASTIC MATERIALS PRODUCED THEREFROM

[75] Inventors: Karen A. Moffat, Brantford; Marko D. Saban, Etobicoke; Richard P. N. Veregin, Mississauga; Michael K. Georges, Guelph; Gordon K. Hamer; Peter M. Kazmaier, both of Mississauga, all of Canada

[73] Assignee: Xerox Corporation, Stamford, Conn.

[21] Appl. No.: 358,561

[22] Filed: Dec. 14, 1994

[51] Int. Cl.$^6$ .................. C08F 2/38; C08F 10/02
[52] U.S. Cl. .................. 526/204; 526/270; 526/208; 526/352; 526/193; 526/295; 526/318.6; 526/329; 526/331; 526/339; 526/347; 526/348.5; 526/348.7; 526/348.8
[58] Field of Search ............... 526/204, 208, 220, 352

[56] References Cited

U.S. PATENT DOCUMENTS

| | | | |
|---|---|---|---|
| 3,682,875 | 8/1972 | Sullivan et al. | 526/220 |
| 3,879,360 | 4/1975 | Patron et al. | 526/220 |
| 3,954,722 | 5/1976 | Echte et al. | 526/68 |
| 4,201,848 | 5/1980 | Kotani et al. | 525/314 |
| 4,207,266 | 6/1980 | Opie | 570/144 |
| 4,340,708 | 7/1982 | Gruber | 526/313 |
| 4,581,429 | 4/1986 | Solomon et al. | 526/220 |
| 4,736,004 | 4/1988 | Scherer, Jr. et al. | 526/206 |
| 4,777,230 | 10/1988 | Kamath | 526/86 |
| 5,059,657 | 10/1991 | Druliner et al. | 525/244 |
| 5,100,978 | 3/1992 | Hasenbein et al. | 526/86 |
| 5,130,369 | 7/1992 | Hughes et al. | 524/846 |
| 5,173,155 | 12/1992 | Caneba | 526/208 |
| 5,216,096 | 6/1993 | Hattori et al. | 526/201 |
| 5,322,912 | 6/1994 | Georges et al. | 526/204 |

FOREIGN PATENT DOCUMENTS 0135280 3/1985 European Pat. Off. .
478838 7/1975 U.S.S.R. .

OTHER PUBLICATIONS

G. Moad et al., "On the Regioselectivity of Free Radical Processes; Reactions of Benzoyloxy, Phenyl and t-Butoxy Radicals with Some $\alpha,\beta$-Unsaturated Esters," *Aust. J. Chem.*, vol. 36, pp. 1573-1588 (Aug. 1983).

A. V. Trubnikov et al., "Inhibition of Polymerization of Vinyl Monomers Using Nitride and Iminoxide Radicals," *Vysokomol. Soedin.*, Ser. A, vol. 20, No. 11, pp. 2448-2454 (1978).

E. G. Rozantsev et al., "Synthesis and Reactions of Stable Nitroxyl Radicals II. Reactions," *Synthesis*, pp. 401-414 (Aug. 1971).

G. Moad et al., "A Product Study of the Nitroxide Inhibited Thermal Polymerization of Styrene," *Polymer Bulletin*, vol. 6, pp. 589-593 (1982).

R. Grant et al., "Solvents Effects on the Reaction of t-Butoxy Radicals with Methyl, Methacrylate," *Aust. J. Chem.* vol. 36, pp. 2447-2454 (1983).

S. Bottle et al., "The Mechanism of Initiation in the Free Radical Polymerization of N-Vinylcarbazole and N-Vinylpyrrolidone," *European Polymer J.*, vol. 25, pp. 671-676 (1989).

M. D. Gol'dfein et al., "Inhibition of Styrene Polymerization by the Stable Radical 4,4'-diethoxydiphenylnitroxide," *Vysokomol. Soedin.*, Ser. A, vol. 16, No. 3, pp. 672-676 (1974).

M. D. Gol'dfein et al., "Effect of Free Stable Radicals on the Kinetics and Mechanism of Polymerization of Some Vinyl Monomers," *Vysokomol. Soedin.*, Ser. A, vol. 17, No. 8, pp. 1671-1671 (1975).

(List continued on next page.)

*Primary Examiner*—Mark Nagumo
*Attorney, Agent, or Firm*—Oliff & Berridge; Eugene O. Palazzo

[57] ABSTRACT

A free radical polymerization process for the preparation of a thermoplastic resin includes heating a mixture comprised of a free radical initiator, a stable free radical agent, and ethylene at a temperature of from about 40° C. to about 500° C. and at a pressure of from about 500 to about 5,000 bar to form a thermoplastic resin. The thermoplastic resin has a molecular weight distribution of from about 1.0 to about 2.0.

17 Claims, No Drawings

OTHER PUBLICATIONS

A. V. Trubnikov et al., "Effect of Stable Radicals on Polymerization of Styrene," *Vysokomol. Soedin.*, Ser. B, vol. 18, No. 6, pp. 419–422 (1976).

A. V. Trubnikov et al., "Mechanism of Inhibition of Vinyl Monomer Polymerization by Stable Radicals," *Vysokomol. Soedin.*, Ser. B, vol. 18, No. 10, pp. 733–736.

D. Solomon et al., "A New Method for Investigating the Mechanism of Initiation of Radical Polymerization," *Polymer Bulletin*, vol. 1, pp. 529–534 (1979).

P. Griffiths et al., "Initiation Pathways in the Polymerization of Alkyl Methacrylates with tert-Butoxy Radicals," *J. Macromol. Sci.-Chem.*, A17(1), pp. 45–50 (1982).

G. Moad et al., "Selectivity of the Reaction of Free Radicals with Styrene," *Macromolecules*, vol. 15, pp. 909–914 (1982).

G. Moad et al., "The Reaction of Acyl Peroxides with 2,2,6,6-tetramethyl-piperidinyl-1-oxy," *Tetrahedron Letters*, vol. 22, pp. 1165–1168 (1981).

G. Moad et al., "The Reaction of Benzoyloxy Radicals with Styrene-Implications Concerning the Structure of Polystyrene," *J. Macromol. Sci.-Chem.*, A17(1), pp. 51–59 (1982).

P. Griffiths et al., "Synthesis of the Radical Scavenger 1,1,3,3-tetramethylisoindolin-2-yloxyl," *Aust. J. Chem.*, vol. 36, pp. 397–401 (1983).

G. Moad et al., "Reactions of Benzoyloxy Radicals With Some Common Vinyl Monomers." *Makromol Chem. Rapid Commun.*, vol. 3, pp. 533–536 (1982).

P. Griffiths et al., "Quantitative Studies of Free Radical Reactions With the Scavenger 1,1,3,3,-tetramethyl-isoindolinyl-2-oxy," *Tetrahedron Letters*, vol. 23, pp. 1309–1312 (1982).

E. Rizzardo et al., "Initiation Mechanisms in Radical Polymerizations: Reaction of Cumyloxy Radicals with Methyl Methacrylate and Styrene," *Aust. J. Chem.*, vol. 35, pp. 2013–2024 (1982).

M. Cuthbertson et al., "Head Addition of Radicals to Methyl Methacrylate," *Polymer Bulletin*, vol. 6, pp. 647–651 (1982).

E. G. Rozantsev et al., Synthesis and Reactions of Stable Nitroxyl Radicals I. Synthesis, pp. 190–202, 1971.

Hans-Georg Elias et al, Macromolecules.2, 2d Ed p. 719, Plenum Press, New York.

J. Kochi, "Free Radicals", vol. I, 16–24, 126–129, 278–281 and 290–293, Wiley, N.Y., 1973.

J. K. Kochi, "Free Radicals", vol. II, 88–89, 122–125, 132–135, 166–167 and 382, Wiley, N.Y., 1973.

D.C. Non Hekel et al., "Free-Radical Chemistry", 140–145, 196–203, 208–209, 212–213, 216–217 and 238–241, Cambridge, 1974.

W. Funke, "Progress In Organic Coatings", vol. 21, Nos. 2–3, pp. 227–254, Dec. 20, 1992.

Owen W. Webster, "Living Polymerization Methods", Science, vol. 251, pp. 887–893, Feb. 22, 1991.

Charles H. J. Johnson et al. "The Application of Supercomputers in Modelling Chemical Reaction Kinetics: Kinetic Simulation of 'Quasi-Living' Radical Polymerization", Aust. J. Chem., vol. 43, pp. 1215–1230, 1990.

Ezio Rizzardo, "Living Free Radical Polymerisation," Chemistry in Australia, Jan.–Feb. 1987, p. 32.

E. J. Rauckman et al., "Improved Methods For The Oxidation of Secondary Amines To Nitroxides", Synthetic Communications, vol. 5(6), pp. 409–413 (1975).

STABLE FREE RADICAL POLYMERIZATION PROCESS AND THERMOPLASTIC MATERIALS PRODUCED THEREFROM

BACKGROUND OF THE INVENTION

This invention relates to improved polyethylene homopolymers and random copolymers with controlled narrow molecular weight distributions, and a process for producing such compositions. The process is particularly useful in the production of polyethylene homopolymers and random copolymers for use in a wide variety of thermoplastic applications. The present invention also relates to such polyethylene compositions produced by a stable free radical polymerization process.

The polyethylene compositions of the present invention may be formed into a variety of thermoplastic products, for example by known processes such as coating, rotational molding, thermoforming, extruding, injection molding and blow molding processes. Examples of such thermoplastic products include kitchenware, coating films over paper or aluminum foil for packaging, linings for chemical drums and water piping, and uses in electrical wire and cable insulation. In addition, because of its good chemical resistance, polyethylene is found in chemical ware and as a component of electrical apparatus.

The production of polyethylene polymers having varying structure and characteristics is known in the art. For example, low density polyethylene (LDPE) may be made by polymerizing ethylene gas under a pressure of 1,000 to 3,000 bar at temperatures between 120° C. and 350° C. with 0.05 to 0.1% oxygen or peroxide initiators. This reaction may be performed in a tubular reactor of about one mile in length by a continuous process. The peroxide initiator, such as benzoyl peroxide, is added as a solution in food grade hydrocarbon solvent at the beginning of the reaction and also injected into the middle of the reactor. This process produces low density polyethylene polymer with a high degree of random branching, where the length of each branch is only about 4 carbon units due to back biting of the chains. The standard conversion of monomer to polymer is typically in the range of 15 to 25 percent with limited control over the molecular weight of the polymer and no control over the polydispersity. As a consequence the upper range of the molecular weight is limited to around 70,000.

A high density linear polyethylene polymer with a molecular weight of about 50,000 can be produced in a solution free radical polymerization process in xylene at from 150° C. to 180° C. at pressures of greater than 35 bar, using Chromium and aluminum silica catalysts. Furthermore, Ziegler-Natta catalysts can be used to synthesize low-pressure high density polyethylene polymers. In this process, ethylene is introduced into a dispersion of mixed catalysts such as $TiCl_4$ and aluminum alkyl at a pressure of from 1 to 50 bar and a temperature of from 20° to 250° C. The ethylene gas polymerizes into almost unbranched, linear high density polyethylene of medium to high molecular weight with only a small number of short side-chains.

The use of stable free radicals as inhibitors of free radical polymerization is known, for example as described in G. Moad et al., *Polymer Bulletin*, vol. 6, p. 589 (1982). Studies have also reported on the use of stable free radicals as inhibitors of free radical polymerization performed at low temperatures and at low monomer to polymer conversation rates. See, for example, G. Moad et al., *Macromol Sci.-Chem.*, A17(1), 51 (1982).

Free radical polymerization processes are also generally known in the art. For example, Roland P. T. Chung and David H. Solomon, "Recent Developments in Free-Radical Polymerization—A Mini Review." *Progress in Organic Coatings*, vol. 21, pp. 227–254 (1992), presents an overview of the free radical polymerization process, with an emphasis on recent developments.

U.S. Pat. No. 5,322,912 to Georges et. al. discloses a free radical polymerization process for the preparation of thermoplastic resins. The thermoplastic resins are disclosed as having a molecular weight of from 10,000 to 200,000 and a polydispersity of from 1.1 to 2.0. The process comprises heating a mixture of a free radical initiator, a stable free radical agent, and at least one polymerizable monomer compound to form a thermoplastic resin with a high monomer to polymer conversion ratio, and then cooling said mixture. The polymerization process is carried out at a temperature of from 60° to 160° C. and at a relatively low pressure of about 60 psi (about 4 bars). The process optionally comprises isolating the thermoplastic resin or resins and washing and drying the thermoplastic resin. The patent also discloses the preparation of random and block copolymer thermoplastic resins using the free radical polymerization process. Resins produced by the disclosed process are described as having a narrow molecular weight distribution, and a modality that is controlled by the optional sequential addition of the free radical initiator and stable free radical agent. The patent does not disclose the production of polyethylene homopolymers and random copolymers.

U.S. Pat. No. 5,100,978 to Hasenbein et al. discloses a free radical polymerization process for producing polyethylene homopolymers and copolymers. The polyethylene copolymers include predominant amounts of ethylene and minor amounts of comonomers that are polymerizable with ethylene. The free radical polymerization process is conducted at a pressure of from 1,500 to 5,000 bar and at a temperature of from 40° C. to 250° C. The process includes at least three separate polymerization stages with fresh initiator being introduced in each stage, wherein polymerization proceeds in the presence of the initiator. The process results in a polyethylene homopolymer or copolymer having a density of more than 925 kg/m$^3$.

U.S. Pat. No. 4,581,429 to Solomon et. al. discloses a free radical polymerization process that controls the growth of polymer chains to produce short chain or oligomeric homopolymers and copolymers, including block and graft copolymers. The process employs an initiator having the formula, in part, equal to =N—O—X where X is a free radical species capable of polymerizing unsaturated monomers. The molecular weights of the polymer products obtained are generally from about 2,500 to 7,000 and have polydispersities generally of from about 1.4 to 1.8. The reactions typically have low monomer to polymer conversion rates and use relatively low reaction temperatures, of less than about 100° C., and use multiple stages.

U.S. Pat. No. 4,777,230 to Kamath discloses a free radical polymerization process for producing polymers, wherein monomers are dissolved in solvent with, polymerization initiators (such as peroxide initiators) and an optional chain transfer agent. The polymerization process is conducted at a temperature of from about 90° C. to about 200° C. The resultant polymers have a molecular weight distribution of from about 1.5 to about 2.5, and an average molecular weight of less than about 4,000.

Neither of the latter two patents discloses the production of polyethylene homopolymers and random copolymers at high temperature and pressure using a stable free radical polymerization process.

A problem with conventional polyethylene polymerization processes, however, is that they do not allow for the narrow control of the molecular weight distribution of the polymer or copolymer by a free radical process. The advantage of narrowing the molecular weight distribution of polyethylene polymers is reflected in the performance properties of the resultant polymer. A focus in the thermoplastic resin industry has thus been to develop new grades of polyethylene polymers by reducing the molecular weight distribution of the polymer.

Among the advantages of a narrower molecular weight distribution is a decrease in the temperature at which the polymer may be later processed. Because longer chain polymers require more energy to soften and mold the polymers, the processing temperature may be decreased as the molecular weight distribution is narrowed. This factor is especially advantageous when working with resins of high shear viscosity. A decrease in the low molecular weight fraction of the polymer observed as a low molecular weight tail in the molecular weight distribution also results in less volatiles when molding the polymer, thus producing environmentally friendly and safer materials. In addition, eliminating low molecular weight fractions will also contribute to strengthening of the material. Furthermore, when using polyethylene polymers having a narrower molecular weight distribution, it is possible to produce thinner films of the polymer, without detriment to the film's characteristics and properties.

It has been demonstrated that stable free radical polymerization processes can provide precise control over the molecular weight distribution of polymer chains. For example, U.S. Pat. No. 5,322,912, described above, describes a polymerization process that uses stable free radicals to provide thermoplastic resins having a narrow molecular weight distribution. Although it is not desired to be limited by theory, it is believed that when polymerization reaction processes are performed at temperatures above about 100° C., all of the polymer chains are initiated at about the same time. Reversible coupling of the polymer chains by the stable free radical dramatically reduces termination by irreversible coupling. Therefore, control of the reaction enables the formation of polymer chains having a precise molecular weight and a narrow molecular weight distribution.

SUMMARY OF THE INVENTION

The need continues to exist in the thermoplastic resin industry for improved polyethylene homopolymers and copolymers with improved processing characteristics. Specifically, the need continues to exist for polyethylene polymers with narrower molecular weight distributions, such that processing of the resultant polymer may be conducted more economically at lower temperatures. We have discovered that a stable free radical polymerization process may be applied to the production of polyethylene polymers and copolymers to provide such polyethylene polymers and copolymers having a narrower molecular weight distribution, control over the branching and improved processing characteristics. Such improved polyethylene polymers and copolymers, and a process for producing such compositions, are provided herein.

Specifically, this invention provides a free radical polymerization process for the preparation of a thermoplastic resin, comprising heating at a temperature of from about 40° C. to about 500° C. and at a pressure of from about 500 to about 5,000 bar, a mixture comprised of a free radical initiator, a stable free radical agent and ethylene, to form a polyethylene thermoplastic resin, wherein said thermoplastic resin has a molecular weight distribution of from about 1.0 to about 2.0.

The polyethylene polymers and copolymers of the present invention are useful as substitutes for the polymers and copolymers currently used in the thermoplastic resin industries. The stable free radical polymerization process disclosed herein is particularly useful in the production of polyethylene resins that have a high shear viscosity. As used herein, high shear viscosity refers to the mechanical properties or the mechanical behavior of the polymer, such as its deformation and flow characteristics under stress. The mechanical behavior depends on the degree of crystallinity, the degree of crosslinking and the values of the glass transition temperature and the crystalline melting temperature. Polyethylene is a typical flexible plastic with a tensile strength of 2500 N/cm$^2$, a modulus of 20,000 N/cm$^2$ and an ultimate elongation of 500%. The polyethylene compositions of the present invention have narrower molecular weight distributions as compared to traditional polyethylene materials, and possess improved processing characteristics.

Another advantage of using the stable free radical polymerization process to synthesize homopolymers and copolymers of ethylene is that by protecting the end of the propagating polymer chain with a reversible terminating agent, it is possible to control the rate of addition of the monomer units onto the end of the growing chain (the propagation of the polymer chain). Thus, the ability of the radical chain end to react with another polymer chain to produce crosslinking or branching, or to terminate the polymerization, is decreased. Low density polyethylene (LDPE) materials made by current industrial processes have a high amount of branching that can not be controlled in the traditional manufacturing process. By using the process of the present invention, the control over the structure of the polymer chain even at low molecular weights is made possible. The present invention thus provides precise control over the length of the main polymer chain. This process can also be extended to medium density polyethylene (MDPE) and high density polyethylene (HDPE) materials.

DETAILED DESCRIPTION OF PREFERRED EMBODIMENTS

The improved polyethylene homopolymer and copolymer compositions of the present invention may be produced using an improved free radical polymerization process. Generally, the polymerization process involves the free radical polymerization of ethylene gas in the presence of a liquid hydrocarbon medium containing organic peroxide initiators and/or catalysts. The polymerization process is typically conducted at elevated temperatures and pressures. However, it has been discovered that by adding a nitroxide stable free radical or other stable free radical agent(s) to the process, and with minor modifications in the temperature and pressure, a new class of polyethylene homopolymers and random copolymers can be prepared with narrow molecular weight distributions. This process may be used to produce polyethylene compositions having a narrow molecular weight distribution, such as from about 1.00 to about 2.5, preferably from about 1.05 to about 2.0, and having a molecular weight in the range of from about 5,000 to about 1,000,000 or greater.

The process of the present invention may be applied to producing low, medium and high molecular weight polyethylene homopolymers and copolymers, and may thus be applied to a variety of industrial applications. For example, the present process may be used to produce low molecular weight polyethylenes, such as those having a molecular weight of from about 5,000 to about 60,000; medium molecular weight polyethylenes, such as those having a molecular weight of from about 60,000 to about 200,000; and high molecular weight polyethylenes, such as those having a molecular weight of from about 200,000 to about 1,000,000 or greater.

The process of the present invention may be applied to the free radical polymerization of any monomer that is capable of undergoing a free radical polymerization. However, to provide the improved polyethylene homopolymers and copolymers, ethylene is a preferred monomer for the polymerization reaction.

Various other monomers may be copolymerized with ethylene to prepare random ethylene copolymers. For example, additional monomers that may be added are those that may undergo free radical copolymerization with ethylene under high pressure, and may include, but are not limited to, propylene; butene; hexene; isobutylene; isoprene; butadiene; chloroprene; alpha- or beta- ethylenically unsaturated $C_3$-$C_8$ carboxylic acids, such as maleic acid, fumaric acid, itaconic acid, acrylic acid, methacrylic acid and crotonic acid; alpha- or beta- ethylenically unsaturated $C_4$-$C_{15}$ carboxylic esters or anhydrides, such as methyl methacrylate, ethyl acrylate, n-butyl acrylate, vinyl acetate, styrene, acrylic acid, methacrylic anhydride, maleic anhydride and itaconic anhydride; mixtures thereof and the like. Generally, any of the various vinyl monomers, and derivatives thereof, may be used as additional monomers to produce the random ethylene copolymers.

When copolymers of ethylene and another comonomer are produced, the comonomer content of the copolymer should not exceed about 50%.

The stable free radical agent used in the free radical polymerization process of the present invention can be any stable free radical agent known in the art. These stable free radical agents are well known in the literature; for example G. Moad et al., Tetrahedron Letters, 22, 1165 (1981), which is totally incorporated herein by reference, discloses stable free radical agents as free radical polymerization inhibitors when used at temperatures below 100° C. However, under the free radical polymerization conditions of the present invention, stable free radical agents function as moderators to harness the normally highly reactive and indiscriminate intermediate free radical species. Stable free radical agents are disclosed in U.S. Pat. No. 5,322,912, the entire disclosure of which is incorporated herein by reference. Preferred free radical agents for use in the present invention include those in the nitroxide group of free radicals, for example, PROXYL (2,2,5,5-tetramethyl-1-pyrrolidinyloxy) and derivatives thereof such as 3-carboxyl-PROXYL, 3-carbamoyl-PROXYL, 2,2-dimethyl-4,5-cyclohexyl-PROXYL, 3-oxo-PROXYL, 3-hydroxylimine-PROXYL, 3-aminomethyl-PROXYL, 3-methoxy-PROXYL, 3-t-butyl-PROXYL, 3-maleimido-PROXYL, 3,4-di-t-butyl-PROXYL, 3-carboxylic-2,2,5,5-tetramethyl-1-pyrrolidinyloxy and the like; TEMPO (2,2,6,6-tetramethyl-1-piperidinyloxy) and derivatives thereof such as 4-benzoxyloxy-TEMPO, 4-methoxy-TEMPO, 4-carboxylic-4-amino-TEMPO, 4-chloro-TEMPO, 4-hydroxylimine-TEMPO, 4-hydroxy-TEMPO, 4-oxo-TEMPO, 4-oxo-TEMPO-ethylene ketal, 4-amino-TEMPO, 2,2,6,6-tetraethyl-1-piperidinyloxy, 2,2,6-trimethyl-6-ethyl-1-piperidinyloxy and the like; dialkyl nitroxide radicals and derivatives thereof such as di-t-butyl nitroxide, diphenyl nitroxide, t-butyl-t-amyl nitroxide and the like; DOXYL (4,4-dimethyl-1-oxazolidinyloxy) and derivatives thereof such as 2-di-t-butyl-DOXYL, 5-decane-DOXYL, 2-cyclohexane-DOXYL and the like; 2,5-dimethyl-3,4-dicarboxylic-pyrrole, 2,5-dimethyl-3,4-diethylester-pyrrole, 2,3,4,5-tetraphenyl-pyrrole and the like; 3-cyano-pyrroline, 3-carbamoylpyrroline, 3-carboxylic-pyrroline and the like; 1,1,3,3-tetramethylisoindolin-2-yloxyl and 1,1,3,3-tetraethylisoindolin-2-yloxyl and the like; porphyrexide nitroxyl radicals such as 5-cyclohexyl porphyrexide nitroxyl and 2,2,4,5,5-pentomethyl-$\Delta^3$-imidazoline-3-oxide1-oxyl and the like; galvinoxyl and the like; and 1,3,3-trimethyl-2-azabicyclo[2,2,2]octane-5-one-2-oxide and 1-azabicyclo[3,3,1]nonane-2-oxide and the like; mixtures thereof and the like.

Polymerization initiators may be used in the process of the present invention for their known purposes. Initiators suitable for use in the present process include, but are not limited to, free radical polymerization initiators, such as peroxide initiators and azo initiators. Preferred free radical polymerization initiators for use in the present invention may include, but are not limited to, benzoyl peroxide, lauroyl peroxide, tert-butyl peracetate, di-tert-amyl peroxide, di-tert-butyl peroxide, tert-butyl hydroperoxide, tert-amyl perpivalate, butyl per-2-ethylhexanoate, tert-butyl perpivalate, tert-butyl perneodecanoate, tert-butyl perisononanoate, tert-amyl perneodecanoate, tert-butyl perbenzoate, di-2-ethylhexyl peroxydicarbonate, dicyclohexyl peroxydicarbonate, cumyl perneodecanoate, tert-butyl permaleate, mixtures thereof and the like. Preferred azo initiators may include, but are not limited to, 2,2'-azobis-(isobutyronitrile), 2,2'-azobis(2,4-dimethylvaleronitrile), 2,2'-azobis(cyclohexanenitrile), 2,2'-azobis-(2-methylbutyronitrile), 2,2'-azobis(2,4-dimethyl-4-methoxyvaleronitrile), mixtures thereof and the like. Mixtures of two or more initiators can also be used, if desired.

The molar ratio of the stable free radical agent to free radical initiator may be from about 0.4:1 to about 2.5: 1, and may preferably be in the range of from about 0.6:1 to about 1.9: 1. Although not wanting to be limited by theory, the molar ratio of stable free radical agent to free radical initiator of about 1.3:1, as preferred in an embodiment of the present invention, is believed to be important for success of the polymerization reaction. If the molar ratio is too high then the reaction rate is noticeably inhibited; but if the molar ratio is too low then the reaction product has an undesired increased molecular weight distribution.

The amount of stable free radical agent and free radical initiator used in the polymerization process is directly related to the amount of ethylene and other optional monomers to be polymerized. In embodiments of the present invention, the molar ratio of ethylene and other monomer content to stable free radical agent to free radical initiator may be in the range of from about 100:0.2:1 to about 10,000:2.5:1, and is preferably in the range of from about 300:1.3:1 to about 7,000:1.3:1.

Additionally, the polymerization reaction rate of the ethylene and other monomers may, in embodiments of the present invention, be accelerated and the reaction time reduced by the addition of an organic acid or acids in a molar ratio of stable free radical agent to organic acid(s) in the range of from about 100:1 to about 1:1 and preferably in the range of from about 20:1 to about 5:1. Such acids that may be used in the present invention include, for example, sulfonic, phosphoric or carboxylic acids such as benzoic acid, camphor sulfonic acid, mixtures thereof and the like. The process of the present invention may also incorporate a nitroxide stable radical that contains an acidic functional group, such as 2,2,5,5-tetramethyl-3-carboxyl-1-pyrrolidinyloxy, to increase the rate of reaction without broadening the polydispersity of the polymeric resins. For example, an effective amount of a protic acid, which will not also initiate cationic polymerization, may be added to the reaction mixture. For example, the protic acid may be selected from the group consisting of organic sulfonic, phosphoric and carboxylic acids and nitroxides containing acid functional groups such as 3-carboxyl-PROXYL, with camphorsulfonic acid being preferred. When such an acid or acid functional group-containing compound is incorporated into the reaction mixture, the molar ratio of stable free radical agent to acid may be from about 100:1 to about 1:1, with a preferred ratio of between about 20:1 and about 5:1. Excessive addition of acid beyond the aforementioned amounts may cause the molecular weight distribution of the resultant polymers to broaden.

Additional optional known additives may be used in the polymerization reactions, provided they do not interfere with the objects of the present invention. Such additional additives may provide additional performance enhancements to the resulting product. Such optional additives may include, but are not limited to, colorants, lubricants, release or transfer agents, surfactants, stabilizers, defoamants, mixtures thereof and the like.

The polyethylene polymers are preferably produced according to the process of the present invention with the virtual exclusion of oxygen. Embodiments of the present invention therefore conduct the stable free radical polymerization process in an inert atmosphere, such as under an argon or nitrogen blanket.

The polymerization reaction is carried out at high pressure, such as from about 500 to about 5,000 bar, and preferably at from about 1,000 to about 3,000 bar. The reaction is carried out at a temperature of from about 40° C. to about 500° C., preferably from about 100° C. to about 400° C. and more preferably from about 120° C. to about 350° C.

The free radical polymerization process of the present invention is typically conducted in a liquid hydrocarbon medium. As such, it is preferred that the free radical agent, peroxide initiator, and/or any other polymerizable monomers be contained in a hydrocarbon medium prior to heating and initiation of the polymerization reaction. The hydrocarbon medium is preferably a non-polymerizable medium, such as, for example, benzene, toluene, xylene, ethyl acetate, mixtures thereof and the like. Other solvents may be used as necessary to provide a solution of the polymerizable monomers and other components. Where other solvents are used, it is preferred that the solvents are stable under high pressure free radical polymerization conditions and the polyethylene polymer is soluble in the solvents. The solvent for use in the present invention may thus preferably include, for example, methanol, ethanol, propanol, isopropanol, butanol, isobutanol, amyl alcohol, dimethylsulfoxide, glycol, dimethylformamide, tetrahydrofuran, mixtures thereof and the like.

The amount of hydrocarbon medium and/or solvent that permits the preparation of a homogeneous solution of the stable free radical agent, polymerization initiator, and/or monomers may be mentioned as the minimum amount of hydrocarbon medium and/or solvent to be employed in the process. The upper limit of the amount of hydrocarbon medium and/or solvent is determined by practical and economic considerations, since the hydrocarbon medium and solvent have to be separated from the polymer products when the polymerization reaction is completed. Amounts of from about 2 to about 10 parts by weight of hydrocarbon medium and/or solvent per part by weight of the mixture of reaction components, and preferably from about 4 to about 7 parts of hydrocarbon medium and/or solvent per part of the mixture of reaction components, are often suitable.

The stable free radical polymerization process according to the present invention may be carried out under the temperature and pressure conditions described above. In embodiments, the polymerization reaction may be carried out in either a batch-wise or continuous manner. For example, a continuous reaction may be conducted in an adiabatically operated autoclave or in a corresponding autoclave cascade. Where an autoclave cascade is used, it is possible to use the subsequent autoclave(s) as residence time reactor(s) for completing the conversion of the ethylene and any comonomers. Furthermore, the present polymerization reaction can be carried out in a tubular reactor or in a combination of stirred autoclave and tubular reactor. Operation in series with two stirred autoclaves is particularly preferred, since there is the possibility of achieving virtually complete conversion of the monomers in the second reactor. The polymerization reaction may also be carried out in a batch reactor, for example, in a continuously stirred tank reactor. Additionally, the polymerization process of the present invention may be carried out using the manufacturing equipment and materials employed in conventional free radical polymerization processes.

When the polymerization reaction is completed, or at a desired suitable percent conversion prior to completion, the polymerization reaction may be quenched or terminated by reducing the reaction temperature. For example, the polymerization reaction may be terminated by reducing the processing temperature to below about 100° C., and preferably below about 40° C.; although the exact temperature depends upon the specific reactants involved.

Following completion or termination of the reaction, the resultant polymer can be optionally separated from the reaction mixture, washed and dried. Subsequent processing of the polyethylene homopolymer or copolymer can then be conducted.

The above described process can be used to produce the claimed low, medium and high molecular weight ethylene homopolymers or copolymers, having a desired molecular weight in the range of from about 5,000 to about 1,000,000 or greater with a narrow molecular weight distribution. The molecular weight of the polymers may be controlled by adjusting and controlling the various reaction parameters, such as the ratio of monomer or monomers to initator, reaction temperature, heating temperature profile and conversion of monomer to polymer. For example, as the initiator concentration for a given monomer loading is increased, the molecular weight of the polymer decreases, with other factors held constant. Similarly, as the conversion of monomer to polymer increases, the molecular weight of the resultant polymer increases.

One skilled in the art will recognize that the stable free radical polymerization process, and the products produced thereby, may be adjusted as necessary to achieve product compositions with specific characteristics. The invention will now be described in detail with reference to specific preferred embodiments thereof, it being understood that these examples are intended to be illustrative only, and the invention is not intended to be limited to the materials, conditions, process parameters, etc., recited herein. All parts and percentages are by weight unless otherwise indicated.

EXAMPLES

Example 1

Into a continuous stirred tank reactor is added ethylene gas. The reactor is pressurized up to 2500 bar and the temperature is increased to 250° C. Once the temperature and pressure conditions have been established, a solution of benzoyl peroxide initiator and stable free radical agent TEMPO in xylene is added through an injection port in the reactor. The molar ratio of stable free radical agent TEMPO to initiator is 1.3:1. The polymerization of ethylene is allowed to proceed to the desired conversion and molecular weight, while maintaining a narrow polydispersity throughout the reaction.

Example 2

A solution of benzoyl peroxide initiator and stable free radical agent TEMPO in xylene is added into a continuous stirred tank reactor. The molar ratio of stable free radical agent TEMPO to initiator is 1.3:1. The reactor vessel is sealed and is pressurized with ethylene gas to a pressure of 3000 bar while the temperature of the reactor is increased to 250° C. The polymerization of ethylene monomer is allowed to proceed to the desired conversion and molecular weight, while maintaining a narrow polydispersity throughout the reaction.

What is claimed is:

1. A free radical polymerization process for the preparation of a thermoplastic resin, comprising:
   heating at a temperature of from about 40° C. to about 500° C. and at a pressure of from about 500 to about 5,000 bar, a mixture comprised of a free radical initiator, a stable free radical agent, and ethylene, to form a thermoplastic resin,
   wherein said thermoplastic resin has a molecular weight distribution of from about 1.0 to about 2.0.

2. A process according to claim 1, wherein said heating is conducted at a temperature of from about 120° C. to about 350° C.

3. A process according to claim 1, wherein said heating is conducted at a pressure of from about 1,000 to about 3,000 bar.

4. A process according to claim 1, wherein said stable free radical agent is selected from the group consisting of stable free nitroxide radicals.

5. A process according to claim 4, wherein said stable free radical agent is selected from the group consisting of 2,2,5,5-tetramethyl-1-pyrrolidinyloxy, derivatives of 2,2,5,5-tetramethyl-1-pyrrolidinyloxy, dialkyl nitroxide radicals, derivatives of dialkyl nitroxide radicals, 4,4-dimethyl-1-oxazolidinyloxy, derivatives of 4,4-dimethyl-1-oxazolidinyloxy, 2,5-dimethyl-3,4-dicarboxylic-pyrrole, 2,5-dimethyl-3,4-diethylester-pyrrole, 2,3,4,5-tetraphenyl-pyrrole, 3-cyanopyrroline, 3-carbamoyl-pyrroline, 3-carboxylic-pyrroline, 1,1,3,3,-tetramethylisoindolin-2-yloxy, 1,1,3,3,-tetraethylisoindolin-2-yloxy, porphyrexide nitroxyl radicals, galvinoxyl, 1,3,3-trimethyl-2-azabicyclo[2,2,2]octane-5-one-2-oxide, 1-azabicyclo[3,3,1]nonane-2-oxide, 2,2,6,6-tetramethyl-1-piperidinyloxy, derivatives of 2,2,6,6-tetramethyl-1-piperidinyloxy, and mixtures thereof.

6. A process according to claim 1, wherein said free radical initiator is selected from the group consisting of peroxide initiators and azo initiators.

7. A process according to claim 1, further comprising adding an organic acid to said mixture.

8. A process according to claim 7, wherein said organic acid is selected from the group consisting of organic sulfonic, phosphoric and carboxylic acids.

9. A process according to claim 1, further comprising adding at least one additional polymerizable monomer to said mixture, wherein said additional polymerizable monomer is copolymerizable with ethylene under free radical polymerization conditions.

10. A process according to claim 9, wherein said additional polymerizable monomer is selected from the group consisting of propylene, butene, hexene, isobutylene, isoprene, butadiene, chloroprene, alpha-ethylenically unsaturated $C_3$-$C_8$ carboxylic acids, beta-ethylenically unsaturated $C_3$-$C_8$ carboxylic acids, alpha-ethylenically unsaturated $C_4$-$C_{15}$ carboxylic esters, alpha-ethylenically unsaturated $C_4$-$C_{15}$ carboxylic anhydrides, beta-ethylenically unsaturated $C_4$-$C_{15}$ carboxylic esters, beta-ethylenically unsaturated $C_4$-$C_{15}$-carboxylic anhydrides, vinyl acetate, styrene, and acrylic acid.

11. A process according to claim 9, wherein said additional polymerizable monomer is added to said mixture in an amount of less than about 50 molar percent of said ethylene.

12. A process according to claim 1, wherein said free radical initiator is selected from the group consisting of tert-butyl peracetate, di- tert-amyl peroxide, di-tert-butyl peroxide, tert-butyl hydroperoxide, tertamyl perpivalate, butyl per-2-ethylhexanoate, tert-butyl perpivalate, tertbutyl perneodecanoate, tert-butyl perisononanoate, tert-amyl perneodecanoate, tert-butyl perbenzoate, di-2-ethylhexyl peroxydicarbonate, dicyclohexyl peroxydicarbonate, cumyl perneodecanoate, tertbutyl permaleate, benzoyl peroxide, lauroyl peroxide, 2,2'-azobis(isobutyronitrile), 2,2'-azobis(2,4-dimethylvaleronitrile), 2,2'-azobis(cyclohexanenitrile), 2,2'-azobiso(2-methylbutyronitrile), 2,2'-azobis(2,4-dimethyl-4-methoxyvaleronitrile), azobisisobutyronitrile and mixtures thereof.

13. A process according to claim 1, wherein said heating is conducted in an inert atmosphere.

14. A process according to claim 13, wherein said inert atmosphere comprises argon or nitrogen.

15. A process according to claim 1, wherein at least one of said free radical initiator and said stable free radical agent is dispersed in a hydrocarbon medium.

16. A process according to claim 15, wherein said hydrocarbon medium comprises a non-polymerizable hydrocarbon selected from the group consisting of benzene, toluene, xylene, and ethyl acetate.

17. A process according to claim 1, further comprising cooling said mixture to terminate the polymerization process.

* * * * *